E. W. HOOVER & J. A. COLEMAN.
CAR MOVER.
APPLICATION FILED APR. 16, 1912.
1,035,966. Patented Aug. 20, 1912.
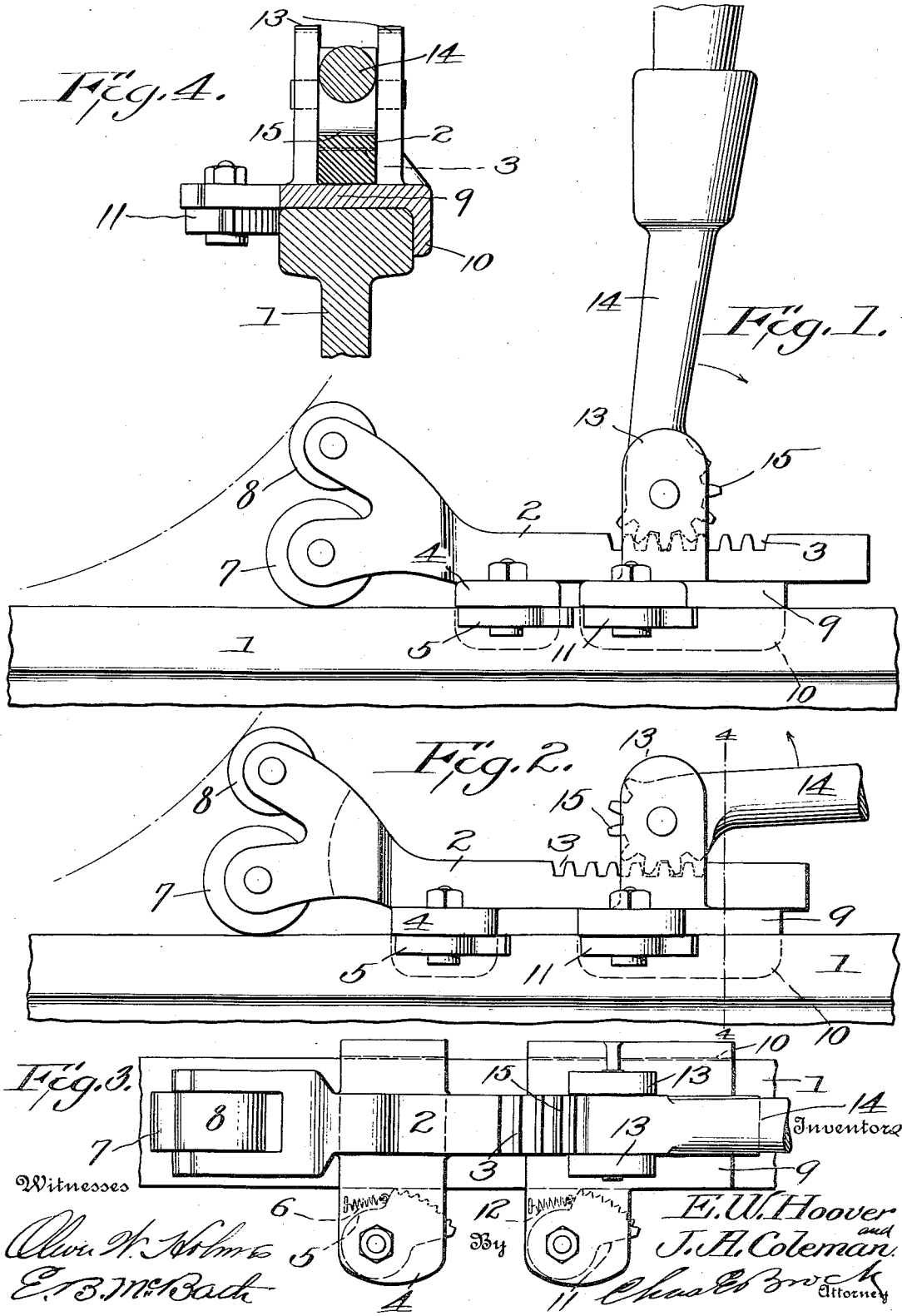

UNITED STATES PATENT OFFICE.

EDGAR W. HOOVER AND JOHN A. COLEMAN, OF DANVILLE, KENTUCKY.

CAR-MOVER.

1,035,966.  Specification of Letters Patent.  Patented Aug. 20, 1912.

Application filed April 16, 1912.  Serial No. 691,149.

*To all whom it may concern:*

Be it known that we, EDGAR W. HOOVER and JOHN A. COLEMAN, citizens of the United States, residing at Danville, in the county of Boyle and State of Kentucky, have invented a new and useful Improvement in Car-Movers, of which the following is a specification.

This invention relates to a device for moving cars along a track, and is designed to supplant the ordinary crow bar or pinch bar in work of this kind.

The invention consists in the novel features of contruction hereinafter described, pointed out in the claims and shown in the accompanying drawings, in which, Figure 1 is a side elevation showing the device in position for use. Fig. 2 is a side elevation showing the parts in the position occupied when the operating lever is in its lowest position. Fig. 3 is a plan view of Fig. 2. Fig. 4 is a vertical section on the line 4—4 of Fig. 2.

In these drawings, 1 represents a track rail upon which is adapted to travel a bar 2, the upper face of the bar being provided with a number of teeth 3 forming a rack portion upon the bar. Connected to said bar in any desired manner is a plate 4 and which extends transversely across the rail, the said plate overlapping the rail upon one side and extending beyond it upon the other side. Under the said extending portion is pivoted a pawl 5 normally held in engagement with the rail by springs 6. An end of the bar 2 is bifurcated and in the members of the bifurcation are mounted rollers 7 and 8, the roller 7 traveling upon the track and the roller being adapted for engagement with a wheel of the car to be moved. A plate 9 is also provided, which overlaps the rail upon one side as shown at 10 and upon the opposite side carries a pawl 11, normally held in engagement with the rail by a spring 12. A plate 9 carries upwardly extending ears 13 between which the bar 2 is adapted to slide and an operating lever 14 is pivoted between said ears and at its lower end carries a segmental rack 15 adapted to engage the teeth 3 of the bar 2.

It will be obvious that with the parts in the position as shown in Fig. 1 that when the lever 14 is thrown downwardly the bar 2 will be pushed toward the car or forwardly, and the plate 9 will be prevented from slipping rearwardly by engagement with the pawl 11 with the rail. As the plate 4 slides with the bar 2, the plates are thus spaced apart. As the lever 14 is raised to its original position the dog 5 will grip the rail and prevent rearward movement of the bar 2 and plate 4, and the plate 9 will therefore slip along the rail thus bringing all parts back to the position shown in Fig. 1. As this movement is repeated the car will be moved along the track a certain distance each time the lever 14 is moved downwardly.

What we claim is:

1. A device of the kind described comprising a bifurcated movable jaw, adapted to be arranged upon a track rail, a roller carried in one of the members of the bifurcation adapted to travel upon the rail, a roller in the other member adapted to engage a car wheel, means for moving the bar forwardly step by step.

2. A device of the kind described comprising two separate plates slidable upon a track rail, a bar carried by one of said plates, a roller carried by said bar adapted to engage a car wheel, said bar being provided with teeth, an operating lever pivotally carried by the other plate and having a rack segment adapted to engage the teeth of the bar, and pawls carried by said plates and adapted to engage the track rail as and for the purpose set forth.

3. A device of the kind described comprising plates adapted to rest transversely upon and overlap a track rail upon one side, to extend beyond said track rail upon the other side, pawls carried under the extending portions of said pawls, springs normally holding said pawls in engagement with the rails, a bar carried by one of said plates, said bar extending parallel to the track rail, the bar having teeth, vertical ears carried by the other plate, the bar being slidable between said ears and a lever pivoted between said ears and having a segmental portion adapted to engage the teeth of the rack bar.

EDGAR W. HOOVER.
JOHN A. COLEMAN.

Witnesses:
EDWARD M. RUE,
GEORGE C. RUE.